(12) United States Patent
Artonne

(10) Patent No.: US 10,893,196 B2
(45) Date of Patent: *Jan. 12, 2021

(54) PANORAMIC CAMERA

(71) Applicant: ImmerVision, Inc., Montreal (CA)

(72) Inventor: Jean-Claude Artonne, Montréal (CA)

(73) Assignee: IMMERVISION, INC., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/423,779

(22) Filed: May 28, 2019

(65) Prior Publication Data

US 2019/0281218 A1 Sep. 12, 2019

Related U.S. Application Data

(63) Continuation of application No. 14/370,268, filed as application No. PCT/CA2013/050001 on Jan. 4, 2013, now Pat. No. 10,356,316.

(30) Foreign Application Priority Data

Jan. 6, 2012 (CA) ...................................... 2763649

(51) Int. Cl.
*H04N 5/00* (2011.01)
*H04N 5/232* (2006.01)
*H04N 5/225* (2006.01)
*H04N 5/262* (2006.01)

(52) U.S. Cl.
CPC ....... *H04N 5/23238* (2013.01); *H04N 5/2252* (2013.01); *H04N 5/23293* (2013.01); *H04N 5/2628* (2013.01)

(58) Field of Classification Search
CPC .......... H04N 5/23238; H04N 5/23293; H04N 5/2252; H04N 5/2628
See application file for complete search history.

(56) References Cited

U.S. PATENT DOCUMENTS

| | | | |
|---|---|---|---|
| 6,677,981 B1 * | 1/2004 | Mancuso | G06T 3/4038 348/36 |
| 6,687,387 B1 * | 2/2004 | Molnar | G06T 3/0043 345/427 |
| 7,242,425 B2 | 7/2007 | Driscoll, Jr. et al. | |
| 2001/0010546 A1 * | 8/2001 | Chen | H04N 5/23293 348/218.1 |

(Continued)

FOREIGN PATENT DOCUMENTS

| | | |
|---|---|---|
| EP | 2397897 A1 | 12/2011 |
| WO | 9917543 A1 | 4/1999 |

OTHER PUBLICATIONS

Int'l Search Report dated Apr. 10, 2013 in Int'l Application No. PCT/CA2013/050001.

*Primary Examiner* — Zhihan Zhou
(74) *Attorney, Agent, or Firm* — Panitch Schwarze Belisario & Nadel LLP

(57) ABSTRACT

A panoramic camera is provided with an orientation sensor to record orientation along with a panoramic image. The display or print image is selected from the captured panoramic image, a warped, non-scale-correct image. The selection of the display image is done using the orientation sensor. The orientation sensor data can be recorded with the panoramic image as metadata. The orientation sensor can also be used to control an external display and/or panoramic image selection during browsing.

12 Claims, 12 Drawing Sheets

(56) References Cited

U.S. PATENT DOCUMENTS

| | | | |
|---|---|---|---|
| 2003/0193606 A1* | 10/2003 | Driscoll, Jr. | G02B 13/06 348/335 |
| 2007/0211955 A1* | 9/2007 | Pan | G06T 3/0043 382/254 |
| 2007/0235648 A1* | 10/2007 | Teich | G08B 13/19641 250/330 |
| 2008/0043020 A1* | 2/2008 | Snow | G06T 17/05 345/427 |
| 2009/0284601 A1* | 11/2009 | Eledath | G06K 9/209 348/157 |
| 2010/0097444 A1* | 4/2010 | Lablans | G03B 35/00 348/46 |
| 2010/0253764 A1* | 10/2010 | Sim | G06T 3/0006 348/39 |
| 2011/0020556 A1 | 1/2011 | Satgurunathan et al. | |
| 2011/0280556 A1* | 11/2011 | Ibi | G03B 17/18 396/53 |
| 2012/0098927 A1* | 4/2012 | Sablak | G08B 13/19604 348/36 |
| 2013/0021445 A1* | 1/2013 | Cossette-Pacheco | G06T 17/20 348/46 |

* cited by examiner

PANORAMIC CAMERA

CROSS-REFERENCE TO RELATED APPLICATION

This application is a continuation application of U.S. patent application Ser. No. 14/370,268, filed on Jul. 2, 2014, entitled "Panoramic Camera," currently pending, which is a Section 371 of International Application No. PCT/CA2013/050001, filed Jan. 4, 2013, which was published in the English language on Jul. 11, 2013, under International Publication No. WO 2013/102271 A1, which claims the benefit of Canadian Patent Application NO. 2763649, filed Jan. 6, 2012, the entire contents of all of which are incorporated by reference herein.

The present invention is concerned with a panoramic camera and more particularly to selecting a portion of a panoramic image to be displayed or printed as a regular view.

BACKGROUND

There exists on the market photographic or video shooting systems that can identify a portrait or landscape mode of a photo position of the shooting devices by means of accelerometers, or gyroscopes or terrestrial magnetic field detector. This is useful in the course of a digital photo or video use since, as opposed to a simple paper printing, the screen itself has an orientation and the user wants to avoid reviewing the images sideways or upside down. This orientation is based on only one axis.

In the context of panoramic photos or videos captured or viewed in real time from a panoramic camera having a wide-angle lens (e.g. fisheye or panomorph), single axis orientation sensors are insufficient because for the image the proportion of the image therefrom stays the same; it is only recognized as being intended to be portrait or landscape. Thus, the width and the height in terms of angular measurement remain the same, although it is customary in panomorph optics for the angular resolution to be increased across an axis).

Although some devices can automatically detect the position of the horizon in a panoramic picture, they do not allow to determine the projection direction when printed on paper or displayed on a screen in a horizontal or vertical direction and to determine a height-width ratio for displaying the picture. This is due to the fact that the captured image is not a portion of a plane defined by the height-width ratio of the device sensor, but rather a portion of a sphere that fits inside or partly on the image sensor.

Moreover, in most cases it is not the whole of the captured environment that is unintelligible because of geometric distortions but only a part thereof, which constitutes the picture to be displayed or printed and for which distortions have to be corrected and perspectives adjusted.

SUMMARY

This is why the present invention concerns a device for obtaining an indication of the orientation of the panoramic camera optics when panoramic images are shot therefrom and for generating information so as to produce an image, to be printed or displayed, wherein the printed or displayed image corresponds to a band of the selected panoramic image according to the camera optics orientation during the panoramic image shooting. The panoramic camera may comprise a three-axis gyroscope or any other device that allows determining its lens/optics orientation.

According to one embodiment, there is provided a space orientation-based panoramic camera having an optics system characterised by an optical axis. The space orientation-based panoramic camera comprises a spatial orientation device for producing an indication of an orientation of the optics system during a shooting of a panoramic image, and an interpretation unit for (i) interpreting the indication of the orientation of the optics systems, (ii) selecting a portion of the panoramic image according to the indication of the orientation of the optics system, and (iii) generating a displayable strip from the selected portion of the panoramic image. A geometric distortion of the displayable strip is mitigated.

In some embodiments, the spatial orientation device of the space orientation-based panoramic camera further determines (i) the orientation of the optical axis relative to an horizontal line, where the horizontal line is defined as an apparent line that separates earth from sky, and (ii) a relative position of the space orientation-based panoramic camera about the optical axis.

In some embodiments, when the orientation of the optical axis is generally parallel to the horizontal line and the space orientation-based panoramic camera is in a first relative position about the optical axis, the strip has a more extent in a direction parallel to the horizon line than in a direction perpendicular to the horizon line, whereas when the orientation of the optical axis is generally parallel to the horizontal line and the space orientation-based panoramic camera is in a second relative position about the optical axis, the strip has a greater extent in a direction perpendicular to the horizon than in a direction parallel to the horizon.

The orientation information can be used to select a fixed view or a direction for panning or scrolling. Thus, the display may be a scroll or pan in a horizontal direction or in a vertical direction in a virtual strip. For example, in an electronic photo frame, it can be desirable not to display the full strip but to scroll/pan along this strip. The strip can be real or virtual when it is in fact only a pan direction which is determined by the device.

In some embodiments, when the orientation of the optical axis is generally perpendicular to the horizontal line, the strip is peripheral or circular, where a circular strip is defined as a 360° peripheral strip.

In some embodiments, there is provided a camera having a spatial positioning device based on at least two axes and an automatic panoramic image orientation interpretation process according to at least two possibilities, divided into subcategories:

1. Frontal vision with horizontal priority, wherein, when the orientation of the panoramic camera optics is in a first orientation relative to a horizontal axis, the panoramic image band corresponding to the displayed/printed image is a horizontal band or strip;
2. Frontal vision with vertical priority, wherein, when the orientation of the panoramic camera optics is in a second orientation relative to a horizontal axis, the panoramic image band corresponding to the displayed/printed image is a vertical band or strip; and
3. Circular/peripheral vision in an upward or downward direction, wherein, when the panoramic camera optics is in a vertical orientation, the panoramic image band corresponding to the displayed/printed image is a circular/peripheral band or strip.

In some embodiments, the space orientation-based panoramic camera comprises a processing unit and/or a storage unit.

In some embodiments, a proportion of the strip is automatically predetermined whereas in other embodiments, the space orientation-based panoramic camera comprises a proportion selector for manually selecting the proportion of the strip.

In some embodiments, generating information for creating a strip comprises discriminating between a horizontal-based frontal vision, a vertical-based frontal vision, and a peripheral/circular vision, wherein: (i) the horizontal-based frontal vision corresponds to a horizontal-like position of the optical axis and a first relative position of the space orientation-based panoramic camera about the optical axis, and the strip has more extent in a direction parallel to the horizon line than in a direction perpendicular to the horizon line; (ii) the vertical-based frontal vision corresponds to a horizontal-like position of the optical axis and a second relative position of the space orientation-based panoramic camera about the optical axis, and the strip has more extent in a direction perpendicular to the horizon line than in a direction parallel to the horizon line; and (iii) the peripheral/circular vision corresponds to a vertical-like position of the optical axis, and the image portion is a circular or a peripheral strip.

In some embodiments, the spatial orientation device is one of the following: an accelerometer, a gyroscope—which can be a three-axis gyroscope—, a terrestrial magnetic field detector or a mechanical articulated device.

In some embodiments, the space orientation-based panoramic camera of claim 1 comprises a visualization screen, an accelerometer for controlling displaying stored images on the visualisation screen, and an image selector based on the accelerometer. A shake of the space orientation-based panoramic camera in a first direction shows on the visualisation screen a next image, and a shake of the space orientation-based panoramic camera in a second direction shows on the visualisation screen a previous image.

There is provided a method for generating a displayable strip from a selected portion of a panoramic image from a shooting by a space oriented-based camera having an optics system characterised by an optical axis. The method for generating the displayable strip comprises producing an indication of an orientation of the optics system during the shooting of the panoramic image by using a spatial orientation device, interpreting the indication of the orientation of the optics systems by using an interpretation unit, selecting a portion of the panoramic image according to the indication of the orientation of the optics system and by using the interpretation unit, and generating the displayable strip from the selected portion of the panoramic image by using the interpretation unit. The geometric distortion of the displayable strip is mitigated.

A panoramic camera is provided with an orientation sensor to record orientation along with a panoramic image. The display or print image is selected from the captured panoramic image, a warped, non-scale-correct image. The selection of the display image is done using the orientation sensor. The orientation sensor data can be recorded with the panoramic image as metadata. The orientation sensor can also be used to control an external display and/or panoramic image selection during browsing.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 3A schematically illustrates a panoramic camera having an orientation sensor providing data related to the orientation of the camera during panoramic image acquisition, the storage of the panoramic image with the orientation data, the selection of the image portion or strip selected according to the orientation sensor data, and finally processing of the panoramic image to output or display a dewarped view taken from the selected portion or strip of the panoramic image for the case when an image portion is selected from a panoramic image shot when the spatial orientation-based panoramic camera of FIG. 3 is in a horizontal-based frontal mode;

DETAILED DESCRIPTION

According to some embodiments, there is provided a spatial orientation-based panoramic camera (hereinafter also referred to as the "panoramic camera") and related methods thereof. Before describing in detail the embodiments, it is worth to recall some relevant prior art.

Figure 1:
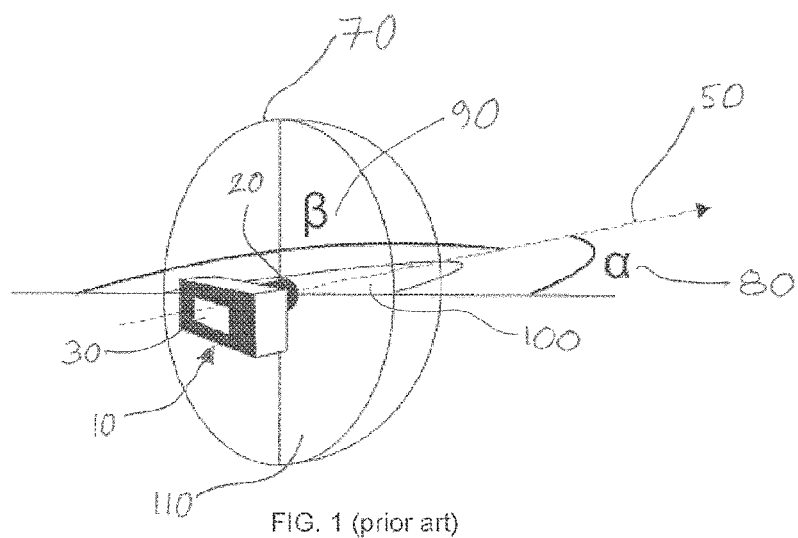
FIG. 1 is a schematic view of a prior art wide angle lens camera having a display screen and showing its field of view.

FIG. 1 (prior art) illustrates that a non-processed panoramic image from a wide-angle lens, such as a fisheye or a panomorph optics, is a distorted projection of the environment, whether it is displayed live or captured as a photo or video.

More specifically, FIG. 1 shows a camera 10 comprising a wide-angle lens or optics 20, and a display 30 for viewing an image captured from the camera 10. It is to be understood that the term "camera" is used here in a broad sense and means any imaging device whether for capturing a picture or a video. The camera 10 is characterized by an optical axis 50 that passes through the lens 20 onto an image sensor (not shown) and the center of an image (not shown) is projected on the viewing device 30. The camera 10 has a field of view 70 that is characterized by an angle α 80 and an angle β 90, wherein the angle α 80 represents half of the field of view in a horizontal plane 100 and β 90 represents half of the field of view in a vertical plane 110. Thus, the angle α 80 and the angle β 90 each represents half of the field of view, wherein the field of view is the total angular aperture of the optics of the viewing device 30. Normally the angle α 80 and the angle β 90 are distributed on both sides of any plane comprising the optical axis 50 and are equal. Moreover, angle α 80 and β 90 are approximately equal regardless the plane in which they are measured (according to quality and the uniformity of the wide-angle optics).

Thus it is impossible to determine the orientation of an environment sphere portion solely on the basis of an image from the camera 10. Even if in certain very specific cases one could consider an intelligent digital shape recognition apparatus that would allow determining a sky position as well as some vertical or horizontal lines, such a method could not be applied to all types of environments and would be costly to implement in terms of computing resources, in addition to not being economically viable in comparison with digital orientation systems such as accelerometers, gyroscopes or terrestrial magnetic field detectors. The latter orientation systems are now well known by the person of ordinary skill in the art and widespread in smart phones and recent digital cameras.

Embodiments of the present invention will now be described, i.e. a spatial orientation-based panoramic camera and related methods thereof. It is to be noted that from here on, the term "panoramic camera" will be used to refer to the spatial orientation-based panoramic camera.

The panoramic camera comprises a spatial orientation device for obtaining information about its spatial orientation. The spatial orientation device can be either a digital sensor or a mechanical articulated device. Examples of digital sensors that can be used as spatial orientation device are accelerometers, gyroscopes—including three-axis gyroscopes—and terrestrial magnetic field detectors. In all cases, the purposes of using an accelerometer is for determining the orientation of the panoramic camera relative to horizontal and/or vertical. "Horizon" or "horizon line" refers to the apparent line that separates the earth from the sky.

An accelerometer, as its name suggests, is used to measure an acceleration, including a gravity field, such as the terrestrial gravity field. Accelerometers are widely used in tablet computers and digital cameras so as to ensure that a picture on a screen thereof is presented upright. As to a gyroscope, it is used to measure or maintain an orientation. Finally, a terrestrial gravity field detector is used to measure the orientation and the magnitude of the terrestrial magnetic field. In all cases of a digital sensor, the latter is used to produce information about the orientation of the panoramic camera.

It is also possible to determine an orientation of the panoramic camera by using a mechanical articulated device that can be move relative thereto so that the position difference between the camera and the articulated device gives an indication of the orientation of the camera when the position of the articulated device is known relative to a spatial marker. For example, the camera can use a tripod stand to provide a level support, and the mechanical articulated device (e.g. encoded articulations) connecting the camera to the tripod can allow the camera to be mounted in different orientations while electronically detecting the orientation. The camera can also be mounted to a vehicle dashboard or frame, bicycle frame or even a helmet, while using a mechanical articulation device to obtain orientation information. Finally, it is also possible to use an optical tracking system as a spatial orientation device in which optical markers on the camera are used to track the camera's position and orientation. This can be practical in closed room applications, such as conference rooms.

More specifically, the spatial orientation sensor or the mechanical articulated device is used to provide information or an indication (i) about the orientation of an optical axis of the panoramic camera relative to the horizon line or to a vertical axis that is generally perpendicular to the horizon line and (ii) about the orientation of the space-orientation-based panoramic camera around the optical axis, i.e. an information about a pivotal or rotational movement of the space-orientation-based panoramic camera around its optical axis.

The spatial orientation-based camera will now be described in with reference to FIGS. 2A, 2B and 2C, which show three different perspective views of the same panoramic camera. It is to be understood that whereas the panoramic camera that is shown thereon is of an ovoid shape, any shape is possible for the panoramic camera, and the ovoid shape is used only to exemplify an embodiment of the present invention wherein an ovoid-shaped panoramic camera is used to show that the shape of the panoramic camera can be used to provide intuitive information to a user thereof.

The panoramic camera 200 comprises an image sensor and lens stack assembly (not shown since it is included within the panoramic camera 200) having a main body 205, and a lens 210, where the optics system is characterized by an optical axis 220. The optical axis 220 is generally oriented perpendicularly to the lens 210. Moreover, the panoramic camera 200 comprises a display screen 230 for displaying an image of a picture or a video that is about to be shot from the panoramic camera, or to display an image or a video that has been stored therein. The main body 205 has generally a smooth surface and, unlike a polyhedron, is devoid of edges and vertices. Accordingly, the panoramic camera 200 is ergonomically designed to be held pleasantly in the hand of a user.

Figure 2A:
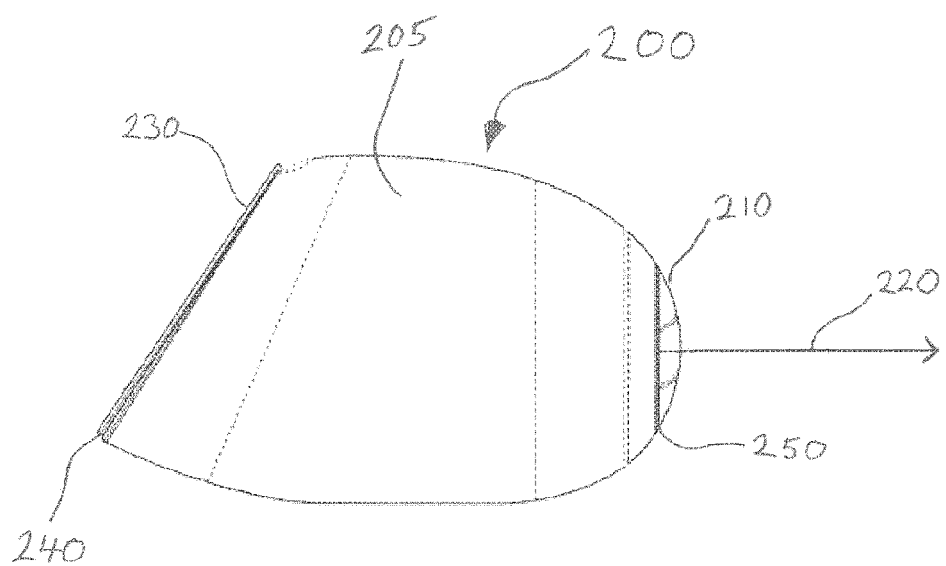
FIG. 2A shows a side view of a panoramic camera that has an ovoid shape with a lens end and an opposed display screen end angled at about 45° to a lengthwise axis of the ovoid shape.
Figure 2B:
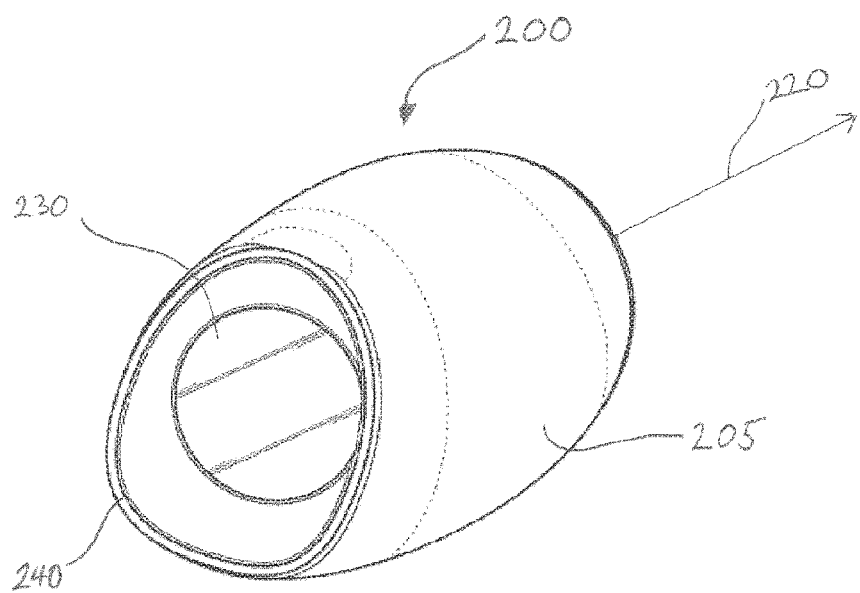
FIG. 2B shows a perspective view from the display screen end of the panoramic camera of FIG. 2A.
Figure 2C:
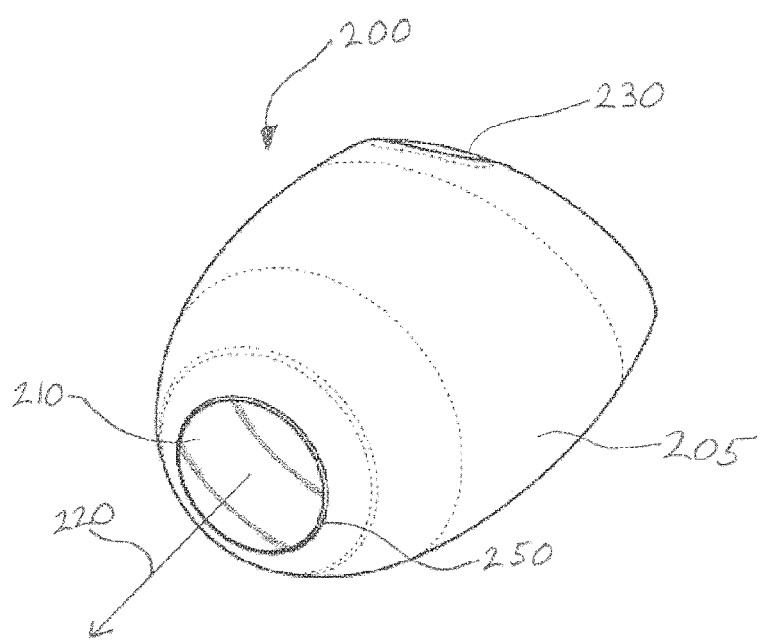
FIG. 2C shows a perspective view from the circular convex lens end of the panoramic camera according to FIG. 2A.

In the embodiment shown on FIGS. 2A, 2B and 2C, the display screen 230 is provided with a circumferential ridge 240 for protecting the viewing screen 230. The screen 230 can be oval-shaped to display the oval-shaped panoramic Image 320 (see FIG. 3A), 360 (see FIG. 4A), 410 (FIG. 5A) in addition to a rectangular view. In this embodiment, the lens 210 and the body 205 form a continuous surface, i.e. there is no noticeable joint between a perimeter 250 of the lens 210 where the latter fits into the body 205. For convenience, the screen 230 makes an angle relative to lens 210 in order to allow a user to see the display screen 230 whether the optical axis 220 the ovoid panoramic camera 200 is pointed horizontally or vertically. The ovoid shape of the panoramic camera 200 intuitively gives a user that holds it information about its orientation in space.

More generally, the shape of the panoramic camera can be a source of intuitive information as to the user's intent with regard to her expected panoramic projection direction if the height-width ratio of the camera is distinctive.

Yet, in another embodiment of the ovoid panoramic camera 200, the screen 230 has a height-width ratio different than one. Moreover, the viewing screen 230 incorporates digital indications (not shown), such as pictograms and text indications In one embodiment, the panoramic camera 200 further comprises a processing unit for processing the information provided by the spatial orientation device about the orientation of the optical axis 220 relative to the horizontal line or to a vertical line generally perpendicular to the horizontal line, and about the orientation of the space orientation-based panoramic camera about its optical axis. Furthermore, the processing unit is used for automatically identifying a panoramic camera user's intent. The latter aspect of the present invention will be described in more detail hereinbelow.

In another embodiment of the present invention, the information from the spatial orientation device, which is typically digitally encoded, is incorporated in each image shot from the panoramic camera 200 or in corresponding metadata (information generally added to an image file header). In all cases, position information can be integrated in the image file or placed in a file linked to the image file. The information can also be stored, in a storage unit either comprised in the space-orientation-based panoramic camera 200 or externally linkable thereto, so that different images and corresponding meta-data can be respectively mapped onto each other. In this manner, information about the position of a panoramic image acquisition is readily accessible by the user. Typically, the information about the panoramic shooting comprises two optical orientations relative to the horizon—i.e. horizontal and vertical—, and two optical orientations about a vertical line, perpendicular to the horizon—upward and downward.

As it will be described more in detail hereinbelow, the spatial information is interpreted so as to determine the user's intent at the moment of the shooting of an image or at the moment of displaying an image appearing on the visualization screen. Moreover, a portion of the image shot by the user is to be displayed, transmitted or printed according to the user's intent, as detected by the spatial orientation device.

More specifically, the panoramic camera is used to (i) capture an image, (ii) select a portion thereof according to the user's intent as interpreted by the spatial orientation device and (iii) either display, print or transmit the portion of the image. The image portion can be displayed on the visualization screen or on a screen that is externally connected to the space orientation-based panoramic camera. For example, an externally connected screen can be a display screen of a smart phone that is in wireless communication with the panoramic camera. More generally, the person of ordinary skill in the art can readily contemplate the panoramic camera's being in communication—whether wireless or not—with another electrical or electronic device so as to transfer the image portion from the panoramic camera to the electrical or electronic device.

Thus, in an embodiment of the present invention, the panoramic camera comprises a transmitting unit for communicating, either wirelessly or not, with another electrical or electronic device, where the other electrical or electronic device is typically (i) another space orientation-based panoramic camera, (ii) a smart phone, (iii) a computer, (iv) a computer tablet or (v) a display device. Accordingly, it is possible for two or more users remotely located relative to each other to share one or many image portions shot by one or more users, either in real or differed time. In the real-time case, a user can dynamically vary the image portion to be transmitted by changing the orientation in space of the space orientation-based panoramic camera.

The functioning of the panoramic camera will now be described in detail, with reference to FIGS. 3, 3A, 4, 4A, 5 and 5A, which all show a spatial orientation-based panoramic camera 260 having an optical axis 270, a viewing screen 280, and an optics system comprising a lens 290. Aside from the lens 290, the optics system is mainly included within the panoramic camera 260. A horizontal axis 300, parallel to the horizontal, and a vertical axis 310, perpendicular to the horizontal, are shown on FIGS. 3, 4 and 5. The spatial orientation device can detect whether the optical axis 270 is mostly in a horizontal position, i.e mostly parallel to the horizon, or mostly in a vertical position, i.e. mostly perpendicular to the horizon.

Figure 3:
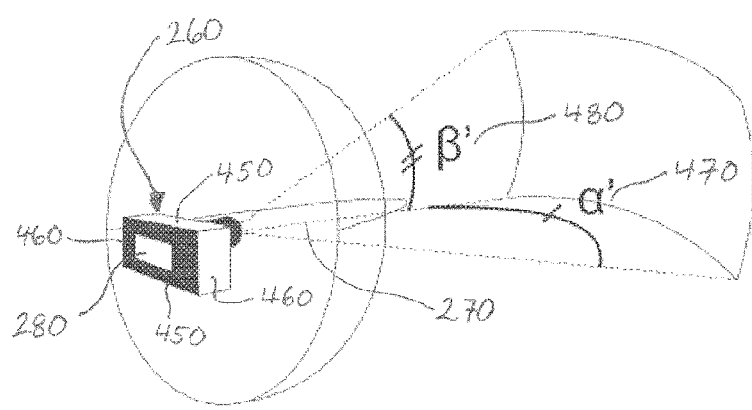
FIG. 3 is a schematic view of spatial orientation-based panoramic camera in a horizontal-based frontal mode.
Figure 3:
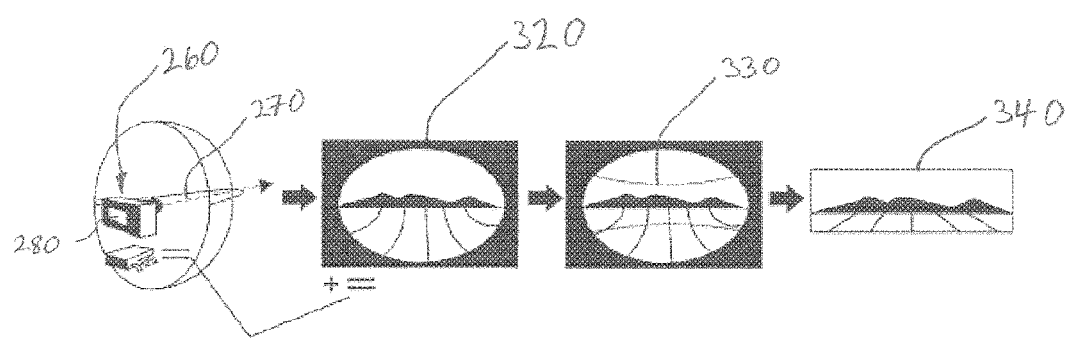
Figure 4:
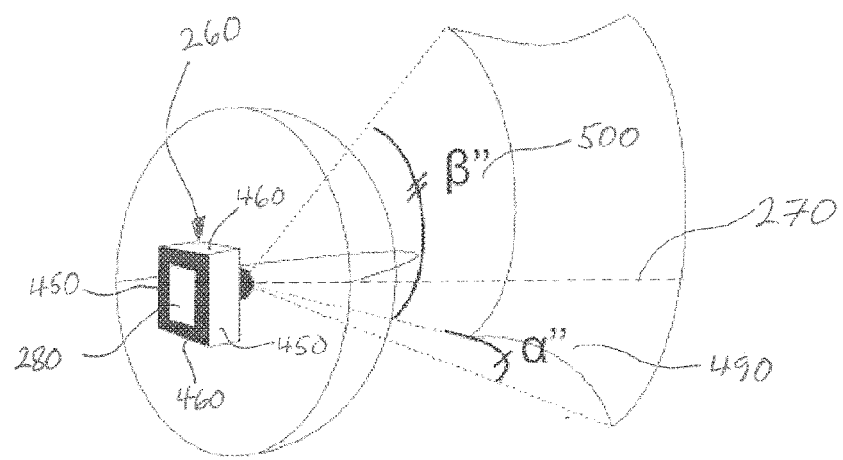
FIG. 4 is a schematic view of spatial orientation-based panoramic camera in a vertical-based frontal mode.
Figure 4A:
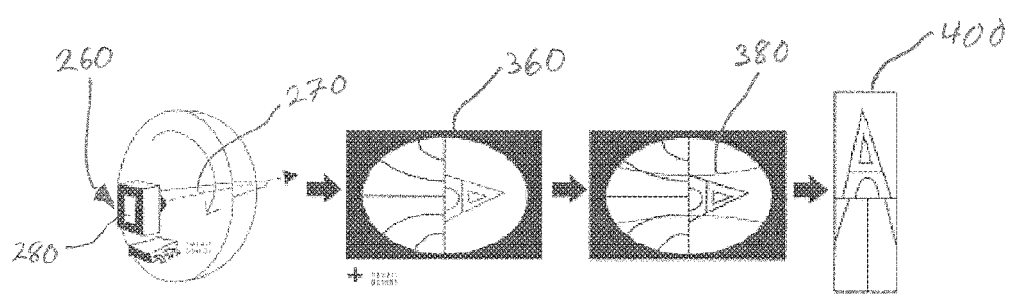
FIG. 4A schematically illustrates a panoramic camera having an orientation sensor providing data related to the orientation of the camera during panoramic image acquisition, the storage of the panoramic image with the orientation data, the selection of the image portion or strip selected according to the orientation sensor data, and finally processing of the panoramic image to output or display a dewarped view taken from the selected portion or strip of the panoramic image for the case when an image portion is selected from a panoramic image shot when the spatial orientation-based panoramic camera of FIG. 4 is in a vertical-based frontal mode.
Figure 5:
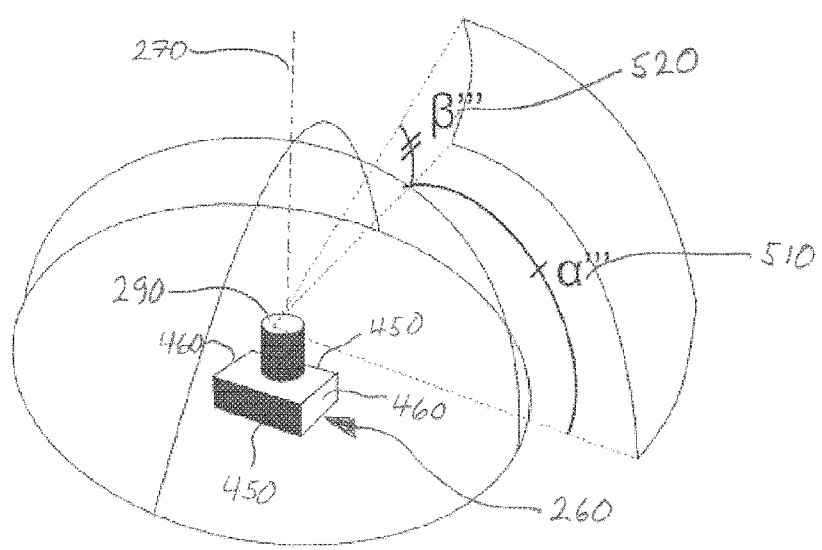
FIG. 5 is a schematic view of spatial orientation-based panoramic camera in a peripheral/circular mode.
Figure 5A:
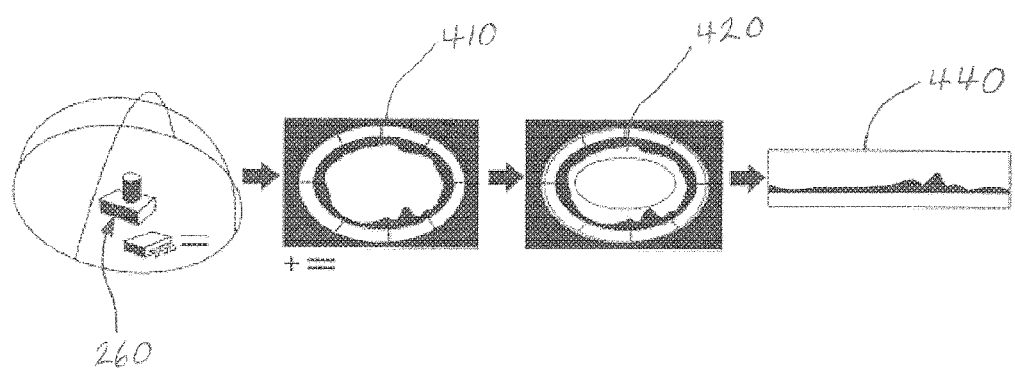
FIG. 5A schematically illustrates a panoramic camera having an orientation sensor providing data related to the orientation of the camera during panoramic image acquisition, the storage of the panoramic image with the orientation data, the selection of the image portion or strip selected according to the orientation sensor data, and finally processing of the panoramic image to output or display a dewarped view taken from the selected portion or strip of the panoramic image for the case when an image portion is selected from a panoramic image shot when the spatial orientation-based panoramic camera of FIG. 5 is in a peripheral/circular mode.

More specifically, the spatial orientation device discriminates between a horizontal position of the panoramic camera 260, as shown in FIGS. 3, 3A, 4 and 4A, wherein the optical axis 270 is assimilated to a line parallel to the horizon, and a vertical position of the optical axis 270, as shown in FIGS. 5 and 5A, wherein the optical axis 270 is assimilated to a line perpendicular to the horizon. When the spatial orientation device detects a horizontal position, the space orientation-based panoramic camera 260 is termed to be in "frontal vision mode" and the lens 290 is mainly directed toward the horizon (FIGS. 3, 3A, 4 and 4A). When the spatial orientation device detects a vertical position, the space orientation-based panoramic camera 260 is termed to be in a "circular/peripheral vision mode" and the lens 290 is mainly directed either upwardly or downwardly (FIGS. 5 and 5A).

In addition to discriminating whether the optical axis 270 is mostly in a horizontal position (resp. frontal vision mode) or in a vertical position (resp. circular/peripheral vision mode), the spatial orientation device discriminates between two positions of the space orientation-based panoramic camera 260 about its optical axis when it is in the frontal vision mode: a horizontal-based frontal mode (FIGS. 3 and 3A) and a vertical-based frontal vision mode (FIGS. 4 and 4A). Each mode determines a portion of an image displayed on the view screen 280 to be selected for displaying, printing or transmitting, wherein the portion of the image is a strip.

The possible modes are summarized below, with characteristics associated with them:
  (i) horizontal-based frontal vision mode: the optical axis is discriminated as being parallel to the horizontal line and the image portion is a strip that is that is longer horizontally than vertically, as shown on FIG. 3A;
  (ii) vertical-based frontal vision mode: the optical axis is discriminated as being parallel to the horizontal line and the image portion is a strip that is longer vertically than horizontally, as shown on FIG. 4A; and
  (iii) circular/peripheral vision mode: the optical axis is discriminated as being vertical and the image portion is a circular or peripheral strip, as shown on FIG. 5A.

Selecting an image portion that is a strip serves the purpose of obtaining a portion of an image where perspective distortions or other geometric distortions are, at least, partly corrected. Thus, the strip to be displayed, printed or transmitted renders a more harmonious representation of the environment than the total image it comes from. This is apparent on FIG. 3A, where, from an image 320 shot by the panoramic camera 260, a strip 330 is selected to be then displayed as a distortion-corrected image 340. Similarly, this is apparent on FIG. 4A, where, from an image 360 shot by the panoramic camera 260, a strip 380 is selected to be then displayed as a distortion-corrected image 400. Once again, similarly, this is apparent on FIG. 5A, where, from an image 410 shot by the panoramic camera 260, a strip 420 is selected to be then displayed as a distortion-corrected image 440.

Whatever the viewing mode that is chosen, the spatial orientation unit is used to produce an indication of the orientation of the optics system during the shooting of the panoramic image. As shown in FIGS. 3A, 4A and 5A, processing of the orientation data and acquired panoramic image is then used for (i) interpreting the indication of the orientation of the optics systems, (ii) selecting a portion of the panoramic image according to the indication of the orientation of the optics system, and (iii) generating a displayable strip from the selected portion of the panoramic image. The strip thus generated can be displayed, printed or transmitted. Geometric or perspective distortions of the strip thus generated are mitigated.

However, the user may want to obtain, in a frontal vision mode, a strip that is horizontally larger than vertically, which is the horizontal-based frontal vision, or a strip that is vertically larger than horizontally, which is the vertical-base frontal vision. The panoramic camera, by way of the spatial orientation device, interprets the user's intent accordingly by detecting the panoramic camera's being held so that its optical axis is mainly horizontal to the horizon line. The panoramic camera further interprets the user's intent as to obtaining a horizontal strip or a vertical strip according to a tilt of the panoramic camera about its optical axis given thereto by the user. On the other hand, if the user wants to obtain a circular or peripheral strip, he directs the optical axis upwardly or downwardly and, again by way of the spatial orientation device, the camera interprets the user's intent as a desire of obtaining a peripheral or a circular strip.

Height-width ratios for strips (horizontal- and vertical-based frontal visions, and peripheral/circular vision) are predetermined. However, in one embodiment, the spatial orientation-based panoramic camera comprises a height-width ratio selector for manually selecting the height-width ratio of the strips.

Yet, in an embodiment of the present invention, the panoramic camera further comprises a processing unit for processing any information from the spatial orientation device, interpreting the user's intent according to any such information and selecting the image portion, i.e. the strip, according to the user's intent.

Yet, in another embodiment of the present invention, the spatial orientation device of the panoramic camera is an accelerometer and is a used to move from one stored image to another by giving the panoramic camera a slight shake that is to be detected by the accelerometer. A method associated therewith is described in more details further below.

FIGS. 3, 4 and 5 show that the panoramic camera 260 is characterised by distinctive physical features namely the panoramic camera 260 has first parallel opposite lateral walls 450 that are larger than second parallel opposite lateral walls 460. Such physical features, which can be different in other embodiments of the present invention, allow a user to know what mode she is intuitively indicating to the panoramic camera 260, (i.e. horizontal- or vertical based frontal mode, or peripheral/circular mode), more precisely the mode in which she wants a picture of a video to be shot. The person skilled in the art will readily contemplate many other physical characteristics that can serve the same purpose.

Frontal Vision

In FIGS. 3 and 4, the optical axis 270 is oriented parallel to the horizontal line, thus indicating a desire of the user for an image to be taken in a frontal mode, i.e. the optical axis 270 is parallel to the horizontal. In FIG. 3, where the optical axis 270 is parallel to the horizontal and the first parallel walls 450 are parallel to the horizontal, a user's intent to shoot in a horizontal-based frontal mode is indicated to the panoramic camera 260. In FIG. 4, where the optical axis 270 is parallel to the horizontal and the second parallel walls 460 are parallel to the horizontal, a user's intent to shoot in a vertical-based frontal mode is indicated to the panoramic camera 260. This is how the position of the optical axis 270 and the relative position of the panoramic camera 260 around the optical axis 270, as detected by the spatial orientation device and as per the information generated by the latter, the panoramic camera 260 deduces and discriminates between a user's preference to obtain a vertical-based frontal vision projection and a horizontal-based frontal-vision projection.

Thus, a simple rotation of the camera about its different axes provides, by means of the spatial orientation device integrated in the camera, the position of the latter relative to said axes.

The camera can also comprise a device that ensures that the center of the image to be displayed or printed is automatically determined according to the position and orientation of the camera.

FIG. 3 shows angles $\alpha'$ 470 and $\beta'$ 480, which respectively represent half of the vision field in a horizontal direction and half of the vision field in a vertical direction. If the panoramic camera 260 is so oriented as to indicate a preference for a horizontal-based frontal vision (FIG. 4), then $\alpha'$ is greater than $\beta'$ so as to create a strip from the image, the horizontal length of which is greater than its vertical length or, equivalently, to create a strip where the ratio height/width smaller than one.

Consequently the projection for printing or displaying includes by default a width (or a number of pixels) greater than its height.

In the case of printing, one can opt for a maximal horizontal display than can go as far as the maximal view angle $\alpha'$ that is possible for the shooting device whereas, for the vertical display, a smaller display is chosen so as to obtain a harmonious perspective correction (the height/width ratio being a subjective choice of the manufacturer of the device or one that is defined by the user).

Similarly, FIG. 4 shows angles $\alpha''$ 490 and $\beta''$ 500, which respectively represent half of the field of view in a horizontal direction and half of the field of view in a vertical direction. If the panoramic camera 260 is so oriented as to indicate a preference for a vertical-based frontal vision (FIG. 4), then $\alpha''$ is smaller than $\beta''$ so as to create a strip from the image, the vertical length of which is greater than its horizontal length or, equivalently, to create a strip where the ratio height/width greater than one.

Consequently the projection for printing or displaying includes by default a width (or a number of pixels) smaller than its height.

In the case of printing, one can opt for a maximal vertical display than can go as far as the maximal view angle $\beta''$ 500 that is possible for the shooting device whereas, for the horizontal display, a smaller display is chosen so as to obtain a harmonious perspective correction (the height/width ratio being a subjective choice of the manufacturer of the device or one that is defined by the user).

The top and the bottom of the image are identified by the spatial orientation device.

In the context of an interactive display where the user zooms and navigates along different axes through a viewing window, the information collected by the spatial orientation device allows automatically choosing the angles and projection axes of the panoramic image and communicating them to a viewing/view image processing software.

Circular/Peripheral Vision

In FIG. 5, the optical axis 270 is oriented perpendicularly to the horizontal or parallel to an upward-downward axis, thus indicating a desire of the user for an image to be taken in a peripheral/circular mode, i.e. the optical axis 270 is perpendicular to the horizontal. This is how the panoramic camera 260 deduces a desire of the user for a peripheral/circular mode, as opposed to a frontal mode.

The position of the panoramic camera in a circular/peripheral vision mode is intuitive for its optical axis is approximately directed downward or upward. Thus simply rotating the panoramic camera about its axes allows providing, through the spatial orientation device integrated thereto, to the panoramic camera, its position relative to the axes.

Thus, a simple rotation of the camera about its different axes provides, by way of the spatial orientation device integrated in the camera, the position of the latter relative to the axes.

The camera can also comprise a device that ensures that the center of the image to be displayed or printed is automatically determined according to the position and orientation of the camera.

FIG. 5 shows angles α''' 510 and β''' 520, which respectively corresponds to the width of the strip that is to be selected from the image displayed on the screen 280 and the height of the strip that is to be selected from the image displayed on the screen 280. Typically, α''' is greater than β'''. As it is apparent of FIG. 5A, α''' can go up to 360°. The lens 290 and the optics system of the panoramic camera 260 is so designed that when the latter is in a peripheral/circular mode, it can capture a peripheral or circular, the circular image being a 360° image. Moreover, lens 290 and the optics system of the panoramic camera 260 is so designed that α''' can be chosen by the user to obtain a strip that encompasses features that are on both sides of the horizon. More precisely, if the lens 290 of the panoramic camera 260 is directed upwardly, it is possible to obtain a strip, a portion of which encompasses some features appearing below the horizon line, and if the lens 290 of the panoramic camera 260 is directed downwardly, it is possible to obtain a strip, a portion of which encompasses some features appearing above the horizon line.

Hence the projection for printing or displaying will have by default a width (or a number of pixels) larger than its height.

When printing, one can opt for a maximal horizontal display depending on the medium or the size of the display screen, where the maximal horizontal display (circular) can go up to 360° of a perimeter around the horizon, whereas a smaller dimension is chosen for the vertical so as to obtain a harmonious perspective correction (the height/width ratio being a subjective choice of the manufacturer of the device or one that is defined by the user).

The top and the bottom of the image are identified by the spatial orientation device.

Again, in the context of an interactive display where the user can zoom and navigate on different axes through a viewing window, the information collected by the device allows automatically choosing the angles and projection axes of the panoramic image and communicating them to the viewing software.

Figure 6:
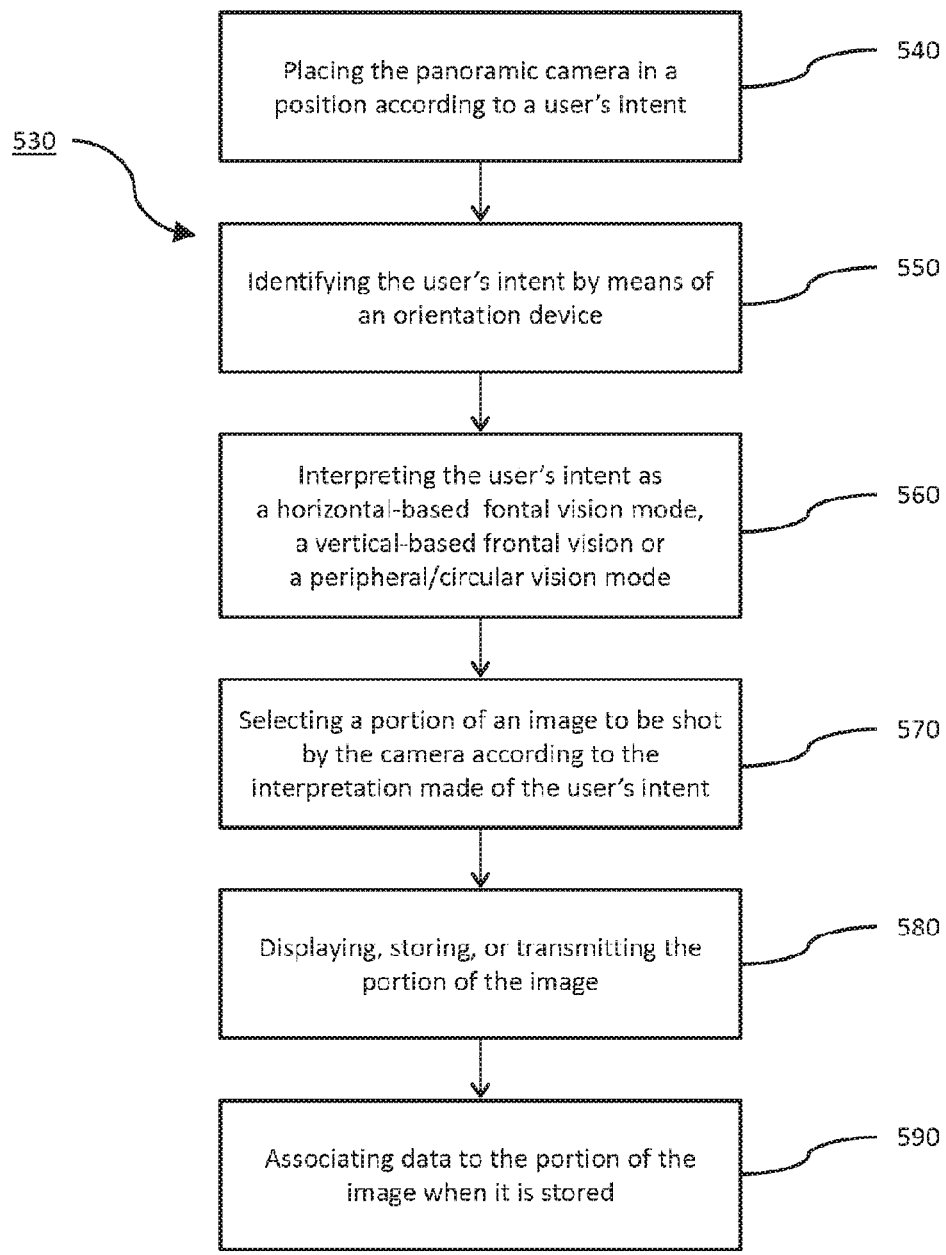
FIG. 6 is a flow diagram illustrating the method in accordance with FIGS. 3A, 4A and 5A.

An embodiment method 530 for using a space orientation-based panoramic camera is now described below, in reference with FIG. 6. The steps of the method 530 are listed below.

Step 540: Placing the panoramic camera in a position according to a user's intent. The user directs the optical axis of the panoramic camera according to her intent. Typically, the panoramic camera has physical features allowing the user to know intuitively how he or she is directing the optical axis of the panoramic camera, even without having to look at the panoramic camera.

Step 550: Identifying the user's intent by means of a spatial orientation device. The panoramic camera is so configured as to interact with the spatial orientation device, which is comprised in the panoramic camera and generates information about the orientation of the optical axis. In another embodiment, the panoramic camera can further use a processing unit to better analyze and process the information generated by the spatial orientation device, and thus more precisely identifying the user's intent.

Step 560: Interpreting the user's intent as a horizontal-based frontal vision mode, a vertical-based frontal vision or a peripheral/circular vision mode. According to the information generated by the spatial orientation device, the panoramic camera discriminates among the three possible modes listed above in step 560. Again, in another embodiment, the panoramic camera can further use a processing unit for better interpreting the user's intent.

Step 570: Selecting a portion of an image to be shot by the camera according to the interpretation made of the user's intent. Typically, the selected portion of the image is a strip, as exemplified in FIGS. 3A, 4A and 5A. Selecting a strip has the advantage of mitigating perspective and geometric distortions that are typical of images shot by a panoramic camera.

Step 580: Displaying, storing, or transmitting the portion of the image. The portion of the image can be displayed on a screen comprised in the panoramic camera or on an external screen in wire or wireless communication with the panoramic camera. The portion of the image can also be stored in the camera or in an external storage unit. Finally, the portion of the image can be transmitted, by means of a wire or wireless communication, to another panoramic camera, a smart phone, a computer or a computer tablet. The transmission can take place either in real or differed time. In another embodiment, the panoramic camera can further use a storage unit to better store portions of images shot by the panoramic camera.

Step 590: Associating data with the portion of the image when it is stored. Data generated during the steps above of the method 530 are associated with a pertaining portion of an image. Such data includes the information generated about the orientation of the optical axis, information about the user's intent, information about the interpretation of the user's intent, the height/width ratio selected by default or manually selected by the user and on the transmission of the portion of the image. Yet, in another embodiment, the panoramic camera can further use a storage unit to better store portions of images shot by the panoramic camera.

The method 530 can further comprise the step of manually selecting the height/width ratio of the portion of the image, i.e. the strip. By "height" it is meant the vertical (i.e. perpendicular to the horizon line) extent of the image portion or the strip whereas "width" means the horizontal (i.e. parallel to the horizon).

The method 530 can further comprise the step of using a display software for better viewing one or many portions of images.

Table 1 below summarises two characteristics, i.e. orientation of the optical axis and height/width ratio of the strip, according to a specific vision mode.

TABLE 1

| Mode | Orientation of the optical axis | Height/width ratio of the strip |
|---|---|---|
| Horizontal-based frontal vision | Horizontal | <1 |
| Vertical-based frontal vision | Horizontal | >1 |
| Peripheral/circular vision | Vertical | <1 |

While the camera as described above has the image processing capabilities to generate the desired view from a strip or portion selected from the panoramic image, the panoramic image can be recorded and transferred to a display screen of larger size, ranging from a smart phone to a tablet to a computer display to a large projection screen. Communication between the camera 260 and the external display or printer can be via Bluetooth, WiFi, other wireless or wired communications. In this case, the display device may perform the view generation, and in accordance with FIG. 6, the panoramic camera having its orientation sensor may serve as a remote control for transmitting the desired orientation to the display device.

In addition to detecting the three basic modes, as described above, an accelerometer and/or a compass device can be used to detect orientation to allow the user to navigate the desired view within the panoramic image to move the view along the alpha and beta directions. The camera 260 would be thus used in a viewing mode as a kind of pointing device for navigation. While the camera could generate the desired view and send the view image to the external display, communication between the accelerometer and/or a compass device and the display is possible such that the computation of the view is done using the display device.

When a compass device is not available, and only acceleration data is available, navigation along the alpha and beta directions can be done by controlled "clicking" action of the camera 260, namely short back and forth rotation motions. This will cause the accelerometer to record a desire to step a certain number of degrees in the alpha and beta directions.

Figure 7:
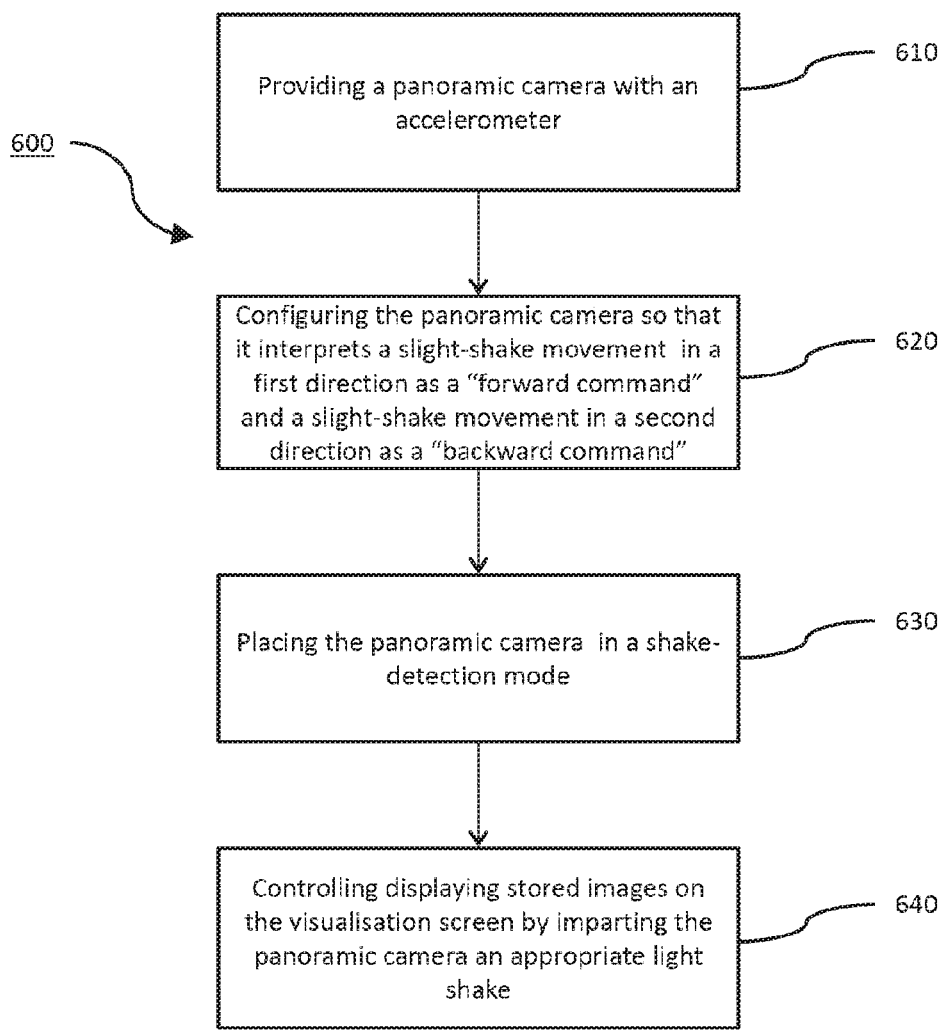
FIG. 7 is a flow diagram illustrating the method according to an embodiment in which the accelerometer is used to control viewing of panoramic images.

A method 600, in reference with FIG. 7, for using an accelerometer for controlling navigation of panoramic images to be displayed on a viewing screen of a panoramic camera will now be described. In the method 600, the spatial orientation device is an accelerometer. The steps of the method 600 are listed below.

Step 610: Providing a panoramic camera with an accelerometer.

Step 620: Configuring the panoramic camera so that it interprets a slight-shake movement in a first direction as a "forward command" and a slight-shake movement in a second direction as a "backward command".

Step 630: Placing the panoramic camera in a shake-detection mode.

Controlling displaying stored images on the display screen by imparting the panoramic camera an appropriate light shake. More precisely, a slight-shake in the first direction, associated with the forward command, is interpreted as a desire for a user to move forward from image stored in the panoramic camera to next image, whereas a slight-shake in the second direction, associated with the backward command, is interpreted as a desire for a user to move backward from one image stored in the panoramic camera to a previous one, the images being intended to be displayed on a display screen of the panoramic camera, or even an external display. In this way, browsing of images stored can be done intuitively using motion cues while holding the camera.

While the above description includes a number of exemplary embodiments, many modifications, substitutions, changes, and equivalents will now occur to those of ordinary skill in the art. It is, therefore, to be understood that the appended claims are intended to cover all such modifications and change.

The invention claimed is:

1. A space orientation-based panoramic camera capturing a panoramic image, the captured panoramic image having perspective and/or geometrical distortion, the camera comprising:
    (a) a spatial orientation device for obtaining both (i) an indication of an orientation of an optical axis of a lens of the panoramic camera relative to a horizon line when capturing the panoramic image and (ii) an indication of a relative position of the panoramic camera about the optical axis when capturing the panoramic image; and
    (b) a processing unit automatically generating, based on the indications obtained by the spatial orientation device, an interpretation of the user's intent at the moment of shooting of an image or at the moment of displaying an image;
the indications of the orientation of the optical axis of the lens of the panoramic camera relative to the horizon line, of the relative position of the panoramic camera about the optical axis, and the interpretation of the user's intent at the time of capturing the panoramic image being used to generate information in order to produce a processed image to be displayed or printed, wherein the processed image to be displayed or printed has the perspective and/or geometrical distortion at least partially corrected and corresponds to a strip of the panoramic image shot by the camera.

2. A camera according to claim 1, wherein the camera is configured to store the panoramic image with orientation data, whereby the image to be displayed or printed using the indication of the orientation can be done externally to the camera.

3. A camera according to claim 1, wherein the device for obtaining an indication of the orientation comprises an accelerometer.

4. A camera according to claim 1, wherein the device for obtaining an indication of the orientation comprises a magnetic field sensor for reading the earth's magnetic field.

5. A camera according to claim 1, wherein said lens is a wide-angle lens capturing a field of view that is essentially at least a hemisphere.

6. A system for displaying an image from a panoramic image comprising:
    a panoramic camera according to claim 1, and further comprising a wireless communications device for communicating to a display device data representing said indication and a panoramic image;
    a display device having a wireless communications device for receiving said data, and a processor for generating a display image from said panoramic image selected using said indication.

7. A method for generating a displayable image by processing a panoramic image from a panoramic camera, the panoramic image from the camera having perspective and/or geometrical distortion, the method for generating the displayable image comprising:
  (a) receiving, by a processing unit, the panoramic image having perspective and/or geometrical distortion;
  (b) receiving, by the processing unit, an indication of a relative orientation of an optical axis of an optical system of the panoramic camera with respect to a horizon line during capture of the panoramic image, the indication of the relative orientation of the optical axis being determined by a spatial orientation device of the panoramic camera;
  (c) receiving, by the processing unit, an indication of a relative position of the panoramic camera about the optical axis during capture of the panoramic image, the indication of the relative position of the panoramic camera about the optical axis being determined by the spatial orientation device;
  (d) automatically generating, by the processing unit based on the received indications, an interpretation of a user's intent at the moment of shooting of an image or at the moment of displaying an image; and
  (e) generating, by the processing unit, the processed displayable image by selecting a portion of the panoramic image captured by the panoramic camera and at least partially correcting the perspective and/or geometrical distortion.

8. The method according to claim 7, further comprising:
  (f) displaying the processed displayable image.

9. The method according to claim 7, further comprising associating metadata with the panoramic image.

10. The method according to claim 7, wherein the spatial orientation device comprises an accelerometer or a magnetic field sensor for reading the earth's magnetic field.

11. The method according to claim 7, further comprising:
  providing the camera with a display device;
  providing the camera with an accelerometer;
  configuring the camera so that a shake movement in a first direction is interpreted as a forward command and a shake movement in a second direction is interpreted as a backward command;
  placing the camera in a shake-detection mode; and
  controlling displaying stored images on the display device by imparting the camera a shake in the first or second direction;
  wherein the forward command causes the next stored image to be displayed and the backward command causes the previous stored image to be displayed.

12. The method according to claim 7, wherein the captured image is part of a video captured by the panoramic camera.

* * * * *